Figure 1:
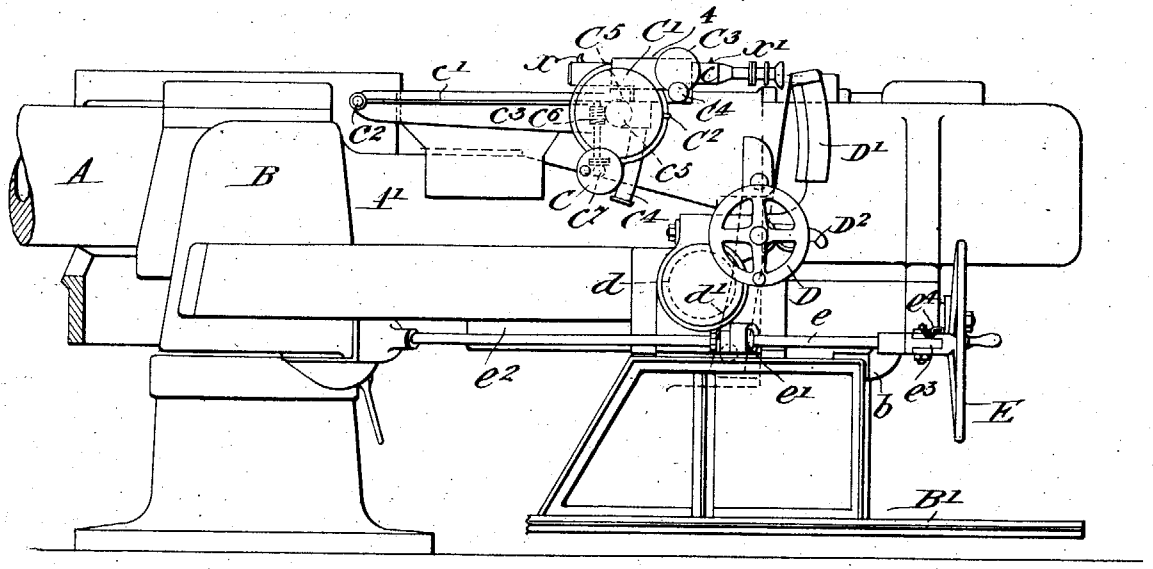

No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 1

Witnesses:
J. E. Spares.
J. Blake

Inventors:
Arthur Trevor Dawson,
George Thomas Buckham,
by their attorney,
Edward S. Reade No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907. 11 SHEETS—SHEET 2.

Witnesses:
F. E. Nares.
G. T. Blake

Inventors.
Arthur Trevor Dawson,
George Thomas Buckham,
by their attorney,
Edward S. Beach No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 3.

Witnesses:
J. E. Nares,
G. Blake

Inventors:
Arthur Trevor Dawson,
George Thomas Buckham
by their Attorney,
Edward S. Beach No. 12,833.

REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 4.

Witnesses:
F. E. Nares,
G. T. Blake

Inventors:
Arthur Trevor Dawson,
George Thomas Buckham,
by their Attorney,
Edward S. Beach No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 5.

Witnesses:
F. E. Nares.
G. T. Blake

Inventors.
Arthur Trevor Dawson.
George Thomas Buckham
by their Attorney,
Edward S. Beach No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 16, 1907.

11 SHEETS—SHEET 6

Witnesses:
F. E. Nares,
G. T. Blake

Inventors:
Arthur Trevor Dawson
George Thomas Buckham
by their Attorney,
Edward S. Rooch No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 7.

Witnesses:
F. E. Nares,
J. Blake

Inventors
Arthur Trevor Dawson,
George Thomas Buckham
by their Attorney
Edward S. Beach No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 8.

Witnesses:
J. E. Nares,
J. Blake

Inventors
Arthur Trevor Dawson,
George Thomas Buckham
by their Attorney,
Edwd S. Beach No. 12,833.

REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 9.

Witnesses:
F. E. Nares,
J. Blake

Inventors:
Arthur Trevor Dawson,
George Thomas Buckham,
by their Attorney,
Edward S. Beach No. 12,833.

REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 10.

Witnesses:

F. E. Nares,

G. Blake

Inventors:

Arthur Trevor Dawson

George Thomas Buckham by their Attorney,

Edwin S. Beach

No. 12,833. REISSUED JULY 21, 1908.

A. T. DAWSON & G. T. BUCKHAM.

SIGHTING AND WORKING OF QUICK FIRING ORDNANCE.

APPLICATION FILED JUNE 18, 1907.

11 SHEETS—SHEET 11.

Witnesses:
F. E. Nares
M. Herskovitz.

Inventors:
Arthur Thom Dawson
George Thomas Buckham
by their attorney
Edward S. Beach

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF WESTMINSTER, ENGLAND.

SIGHTING AND WORKING OF QUICK-FIRING ORDNANCE.

No. 12,833. Specification of Reissued Letters Patent. Reissued July 21, 1908.

Original No. 792,972, dated June 20, 1905, Serial No. 198,167. Application for reissue filed June 18, 1907. Serial No. 379,674.

*To all whom it may concern:*

Be it known that we, ARTHUR TREVOR DAWSON, lieutenant of the Royal Navy and director and superintendent of ordnance works, and GEORGE THOMAS BUCKHAM, engineer, both subjects of the King of Great Britain, residing at 32 Victoria street, Westminster, in the county of London, England, have invented certain new and useful Improvements Relating to the Sighting and Working of Quick-Firing Ordnance, of which the following is a specification.

Our invention relates to the sighting and working of quick-firing ordnance, and is for the purpose of effecting the same in a more efficient, reliable, and convenient manner than heretofore.

Our invention consists chiefly in arranging the sighting, elevating, and training gear of the mounting so that the operations of sighting, elevating, and training may be independently performed by three men or numbers which, for the sake of easy identification, we will hereinafter refer to, respectively as "No. 1", "No. 2", and "No. 3".

We sometimes arrange that all the three men or numbers shall be situated at one side of the mounting in close but not inconvenient proximity to each other and sometimes that they shall be situated two on one side of the mounting and one on the other. In the latter case we preferably situate Nos. 2 and 3 on the left-hand side and No. 1 on the right-hand side, and we then provide means to enable No. 1 to work the sight that No. 2 is using, the said sights being at opposite sides of the mounting.

In order that our invention may be clearly understood and readily carried into effect, we will describe the same more fully with reference to the accompanying drawings, in which:—

Figure 2:
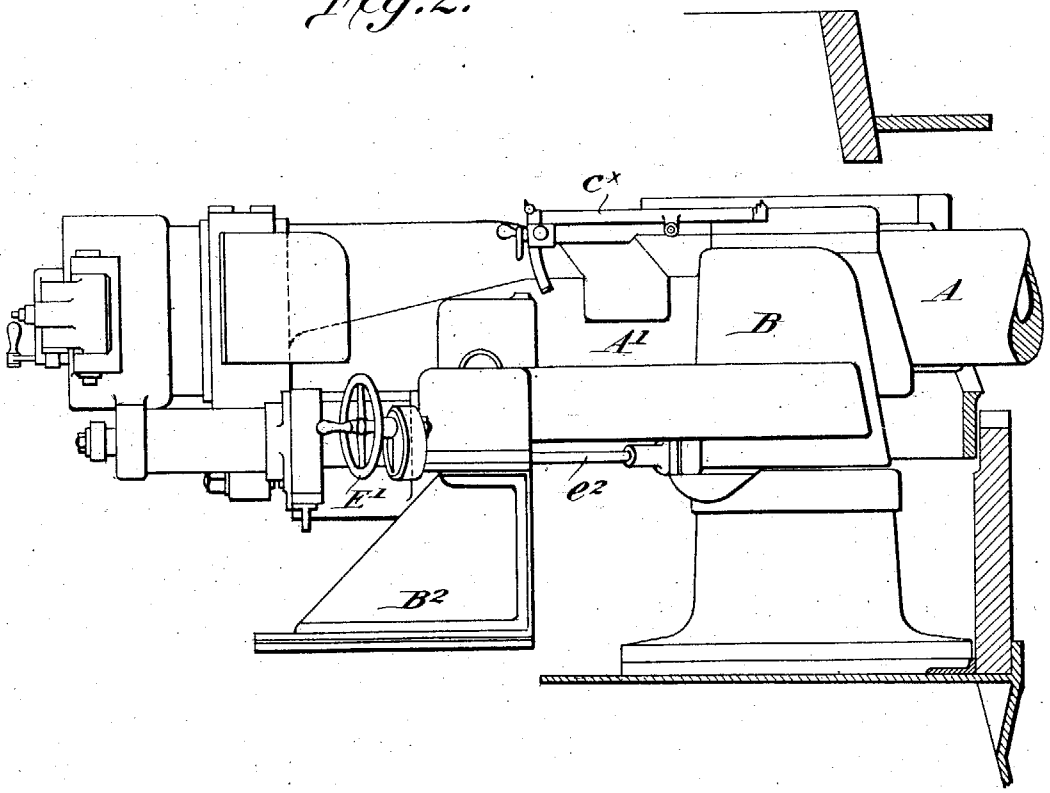
Figure 3:
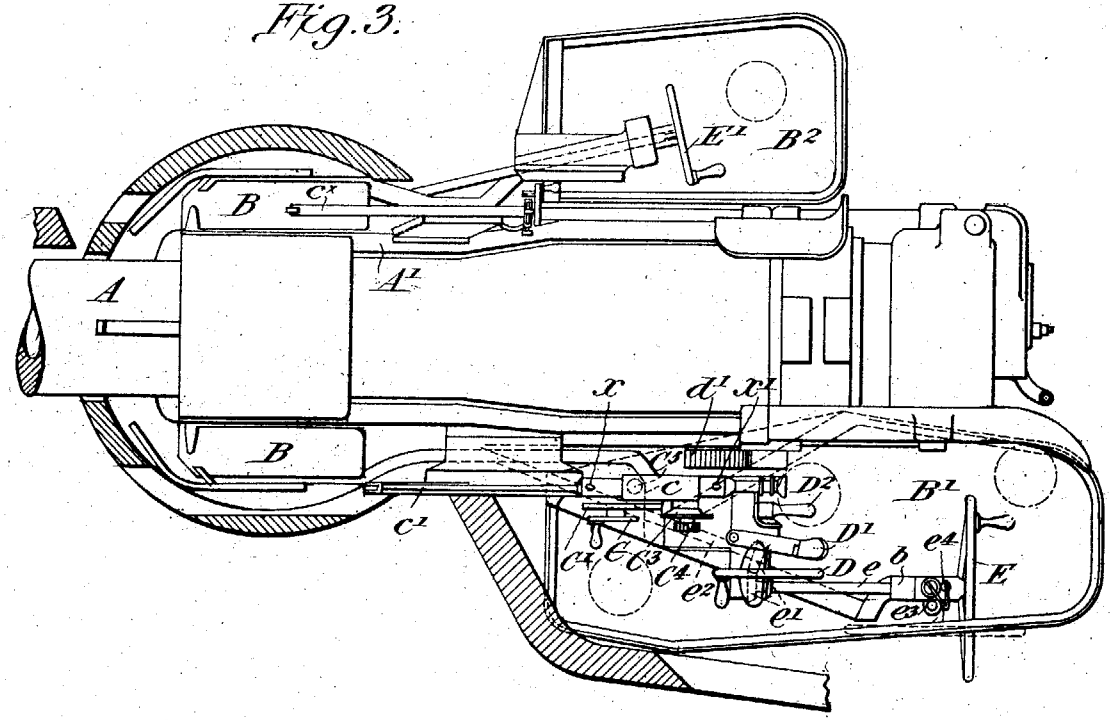
Figure 4:
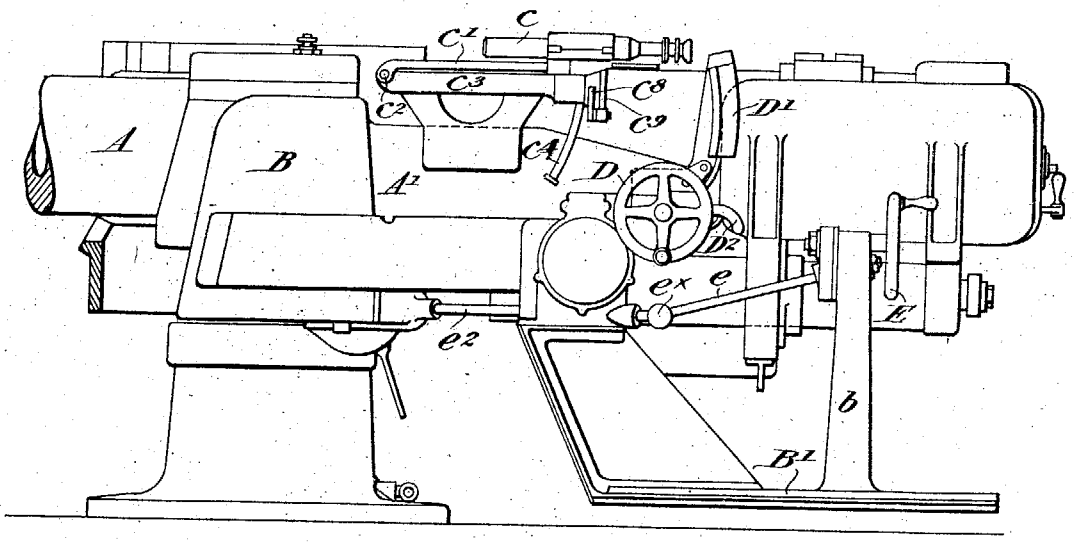
Figure 5:
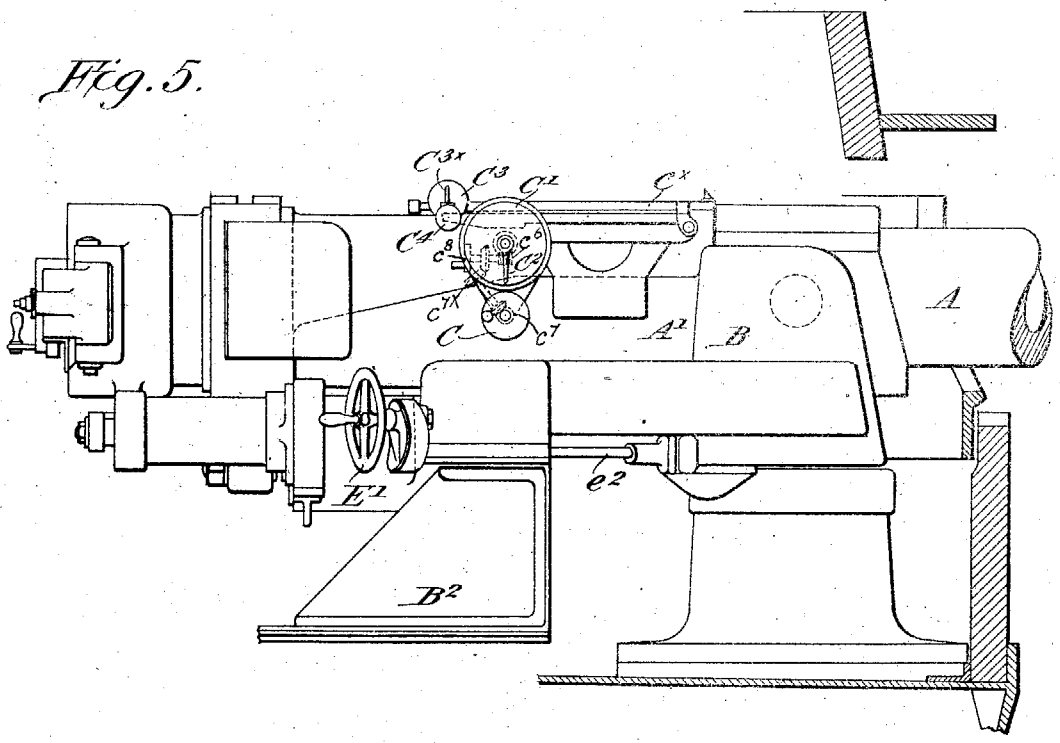
Figure 6:
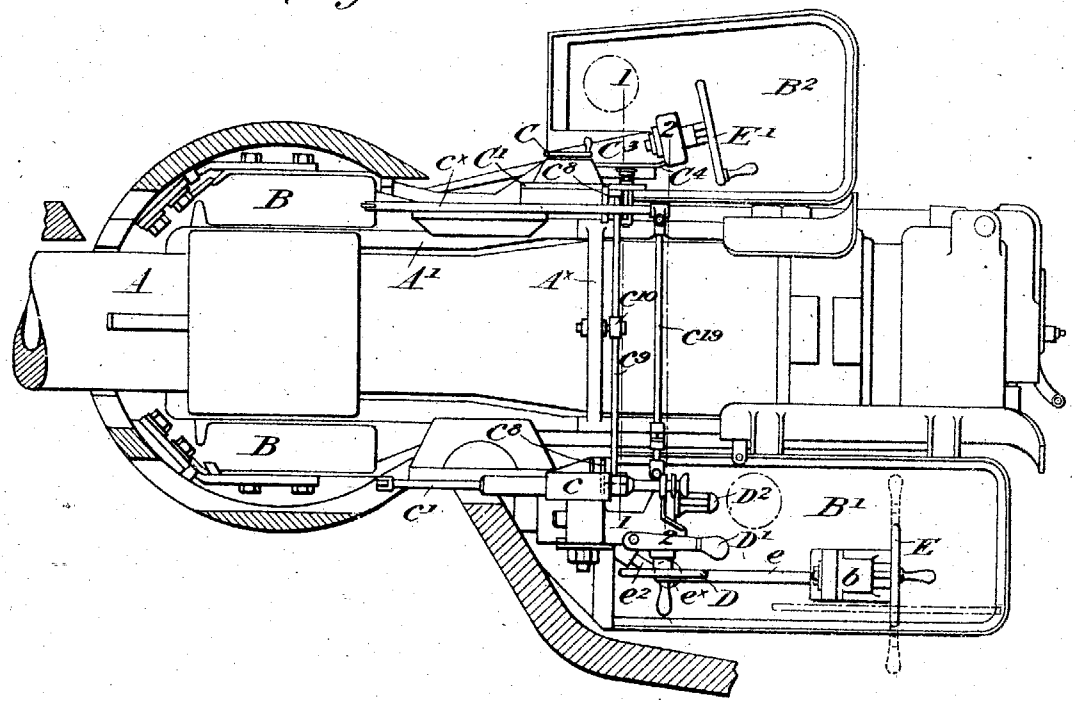
Figure 7:
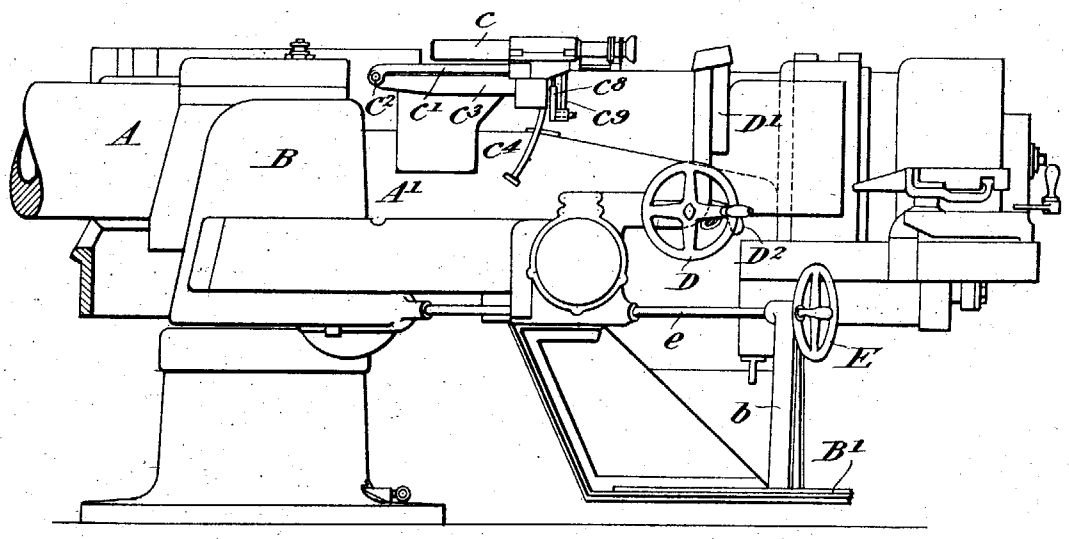
Figure 8:
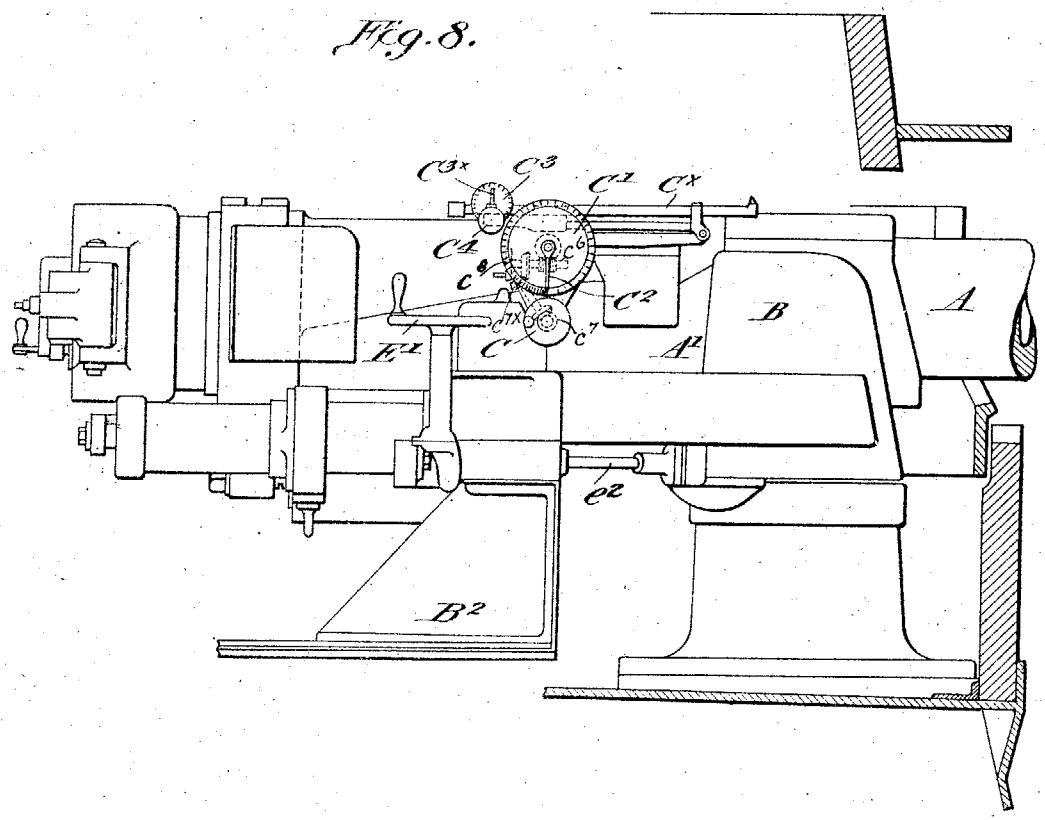
Figure 9:
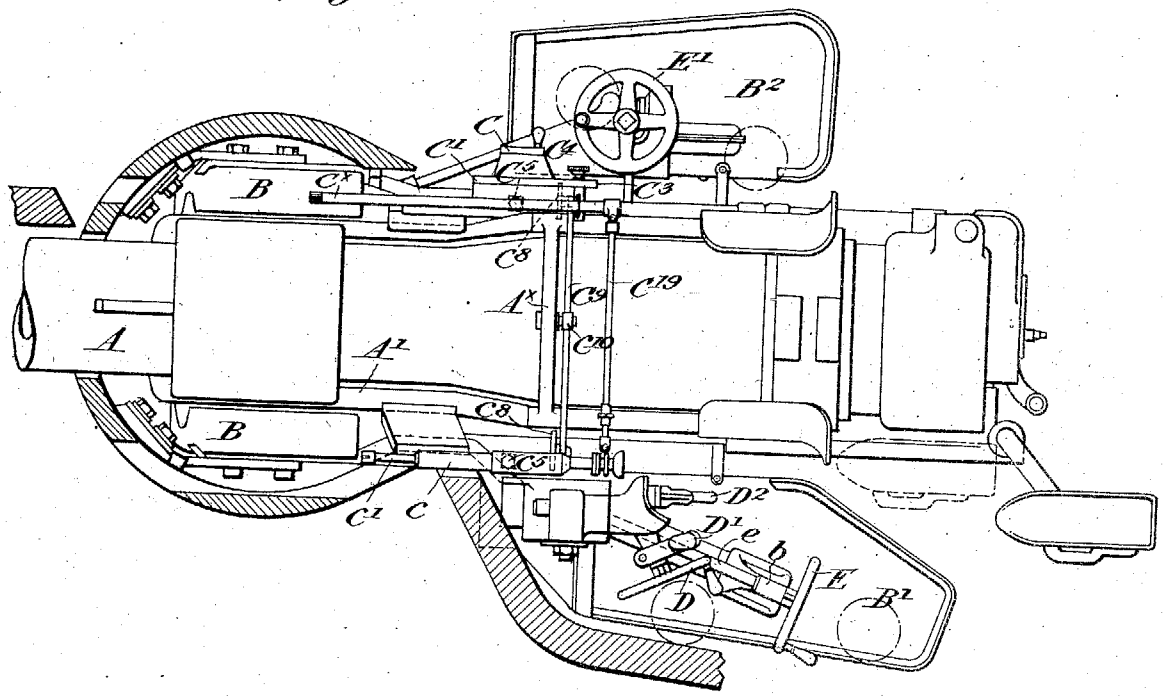
Figure 12:
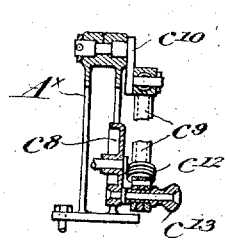
Figure 10:
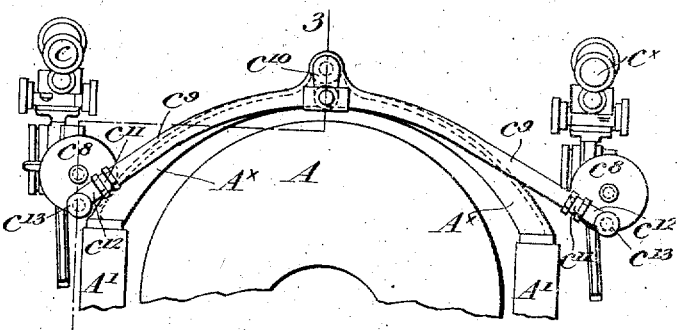
Figure 11:
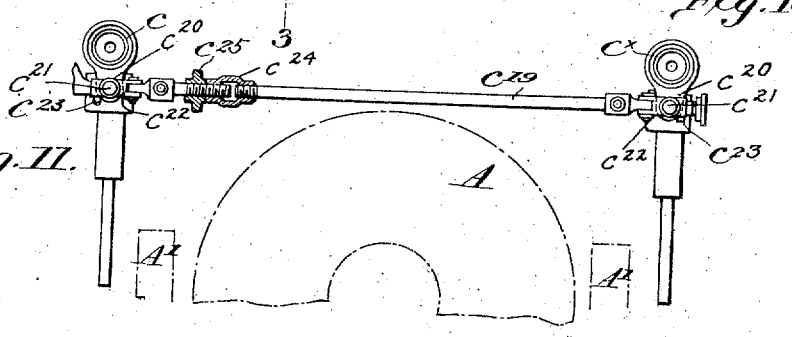
Figure 13:
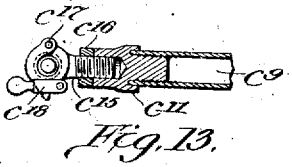
Figure 15:
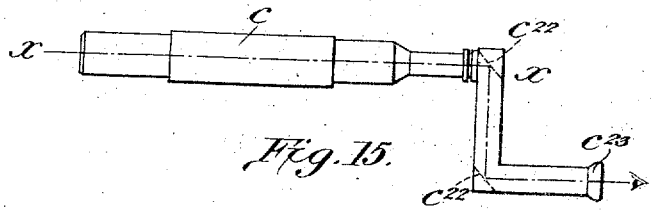
Figure 14:
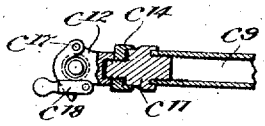
Figure 16:
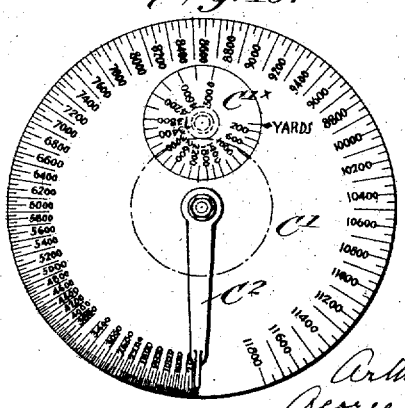
Figure 17:
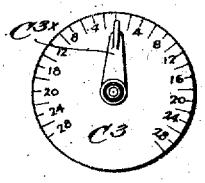
Figure 18:
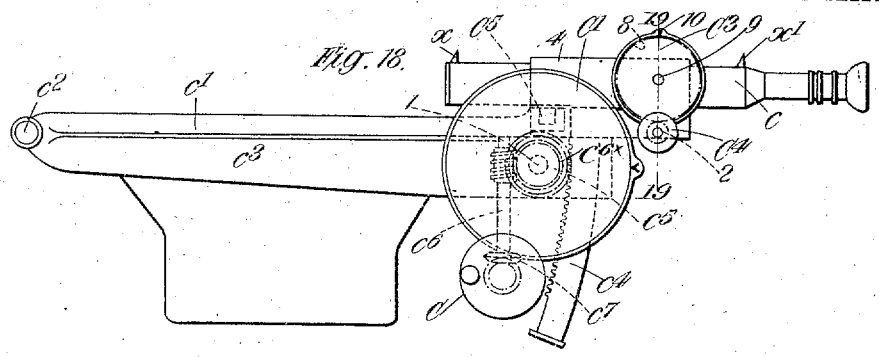
Figure 19:
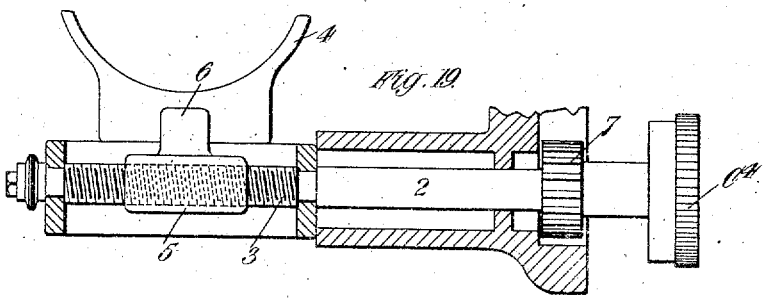
Figure 20:
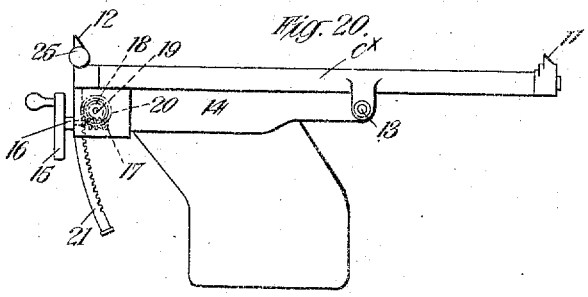
Figure 21:
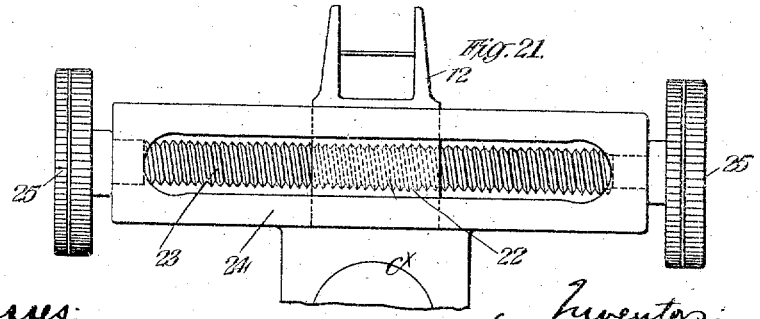

Figure 1 is a left-hand side elevation, Fig. 2 a right-hand side elevation, and Fig. 3 a plan, of a pedestal-mounting for a quick-firing gun with our improvements applied thereto. Figs. 4, 5, and 6, are similar views showing a modification. Figs. 7, 8 and 9 are also similar views showing a further modification. Fig. 10 is a transverse section taken approximately on the line 1 1 of Fig. 6; and Fig. 11, a transverse section taken approximately on the line 2 2 of Fig. 6, showing, on a larger scale, the means for enabling the sight-setting number when situated at one side of the mounting to actuate the sight of the elevating-number for elevation or deflection at the other side of the mounting. Fig. 12 is a vertical section taken approximately on the line 3—3 of Fig. 10. Figs. 13 and 14 are longitudinal detail sections showing two modes of enabling the extremities of the cross-bar forming part of the sight-connecting means illustrated by Fig. 10 to be readily engaged or disengaged with or from the sighting apparatus. Fig. 15 is a detail plan of an arrangement for deflecting the line of sight. Fig. 16 is a front elevation of the range drum or disk, and Fig. 17 is a front elevation of the deflection drum or disk. Fig. 18 is an enlarged side elevation of the left hand sight showing the mechanism for elevating and depressing it about its horizontal pivot. Fig. 19 is a cross section on a still larger scale taken approximately on the line 19—19 of Fig. 18 and showing the mechanism for deflecting the sight about its vertical pivot. Fig. 20 is an enlarged side elevation of the right hand sight showing the mechanism for elevating and depressing it about its horizontal pivot. Fig. 21 is a rear end elevation showing on a still larger scale the mechanism for effecting the lateral deflection.

Like letters of reference indicate similar parts in all the figures.

A is the gun, adapted to recoil in the cradle $A^1$, which is trunnioned in the mounting B.

C is the hand-wheel of the sighting-gear, D the hand-wheel of the gun-elevating gear, and E the hand-wheel of the training-gear.

$B^1$ $B^2$ are platforms which are attached to the mounting and upon which the men or numbers stand in working the sighting, elevating, and training gear.

Referring more particularly to Figs. 1, 2, and 3, in which all the three numbers are situated on the platform $B^1$, one behind the other at one side of the mounting, $c$ is the left-hand sight proper, which in the example shown on an enlarged scale in Fig. 18 is of the telescopic type mounted in a carrier 4 on a bar $c^1$ horizontally hinged at $c^2$ to a bracket $c^3$, attached to the cradle $A^1$ of the gun, so that said sight moves with the gun during the elevation or depression thereof. Movement of the sight about the horizontal hinge $c^2$ is effected by a toothed segment $c^4$ on the bar $c^1$ gearing with a pinion $c^5$ that receives its motion from a worm-spindle $c^6$, which is actuated from the hand-wheel C and bevel-gearing $c^7$ as shown in Fig. 18. $C^1$ is the range drum or disk, which in the present case receives its motion from the aforesaid worm spindle $c^6$ which gears with a worm wheel $c^{6\times}$ fixed on the spindle 1 carrying the pinion $c^5$, and $C^2$ is a fixed index or pointer for enabling any particular graduation of the range drum or disk to be set into the proper position for any particular range. $C^3$ is the graduated deflection drum or disk, which in the present case receives its motion from a spindle 2 carrying the thumb piece or wheel $C^4$, said spindle in its rotation imparting lateral movement to the sight about a vertical pivot $C^5$. This lateral movement is effected by providing the inner end of the spindle 2 with a screw threaded portion 3 gearing with a nut 5 that has a lug 6 to engage with a recess in the lower part of the carrier 4 of the sight proper (see Fig. 19). As the said spindle 2 is revolved in one or other direction by its thumb piece or milled head $C^4$ it will be obvious that the nut 5 will travel along the screw threaded portion 3 and thus impart lateral movement or deflection to the sight and carrier 4 about the vertical pivot $C^5$. Simultaneously with the movement of the said spindle 2 as aforesaid motion is imparted to the graduated deflection disk $C^3$ through the intervention of toothed wheels 7 and 8 the former of which is mounted on the said spindle 2 and the latter upon the axle 9 of the deflection disk. By setting the graduations of the deflection disk with reference to a fixed pointer 10 the degree of deflection imparted to the sight can be readily read off. In working the gun No. 1 stands in front of the said disks or drums $C^1$ and $C^3$ and actuates them in accordance with the orders he receives from the officer in command, thereby changing the elevation and deflection of the sight as required.

The hand-wheel D of the gun-elevating gear imparts motion to a toothed wheel $d$, gearing with a toothed segment $d^1$ on the gun, as is well understood. No. 2 actuates this hand-wheel while looking through the sight $c$ and steadies himself during such operation by leaning against the shoulder-piece $D^1$. He also has control of the firing-lever or pistol-grip $D^2$ for firing the gun. The hand-wheel E of the training-gear is mounted on a shaft $e$ connected by a flexible joint with another shaft $e^2$, that carries a worm gearing with the toothed ring, by which the gun is turned laterally about its vertical pivot in the ordinary way. No. 3 actuates this hand-wheel in accordance with the directions he receives from No. 2. The position of No. 3 behind No. 2 enables him to train the gun within rough limits from his own observation by means of a rough laying-sight $x$ $x^1$, Figs. 1, 3 and 18, fixed on or in close proximity to the sight $c$, which No. 2 uses. The position of this rough laying-sight is such that No. 3 can use it by looking over the shoulder of No. 2. In giving the required elevation and deflection to the sight by No. 1, the sight $c$ has a tendency to move away from the eye of No. 2. To counteract this, No. 2 works the elevating-gear of the gun so as to keep his sight on the object in a vertical plane, and he gives directions to No. 3 regarding the training or lateral movement. No. 2 fires the gun as soon as the sighting has been properly effected. As No. 3 who trains the gun, is situated behind No. 2, it is obviously necessary for the training-wheel to be situated at a considerable distance from the mounting. In order to avoid large brackets projecting from the mounting, we may mount the outer end of the training-shaft $e$ in a bearing carried by a bracket $b$ on the platform $B^1$ and connect it with the other part $e^2$ of the training-shaft which is carried by the mounting by means of the aforesaid flexible joint, which in the present case comprises toothed wheels $e^1$, so that flexure of the platform (due to its resiliency and the movement of the men) in no way interferes with the efficiency of the training gear. Instead of the toothed wheels $e^1$ we may employ a ball-joint $e^\times$, as represented in Figs. 4 and 6. We preferably make the training hand-wheel E of larger diameter than usual in this class of mounting, and in order to allow man No. 2 ready access to and from his position on the platform $B^1$ we make said hand-wheel capable of being swung into or out of position. For this purpose the end of the shaft $e$ to which the hand-wheel E is connected is furnished with a hinge $e^3$, which enables the said hand-wheel to be turned from the position shown by the full lines in Fig. 3 to the position indicated by the dotted lines in this figure, so as to be out of the way of man No. 2 when he is taking his place behind the sight $c$ on the platform $B^1$, as stated above. In order to secure the said hand-wheel in its operative position—that is to say, the position represented by the full lines—we provide a detachable pin or bolt $e^4$, which engages with holes that coincide when the hand-wheel assumes this position.

In the form of our invention shown in Figs. 1, 2 and 3 the right and left hand sights $c$ and $c^\times$ are independently operated in elevating or depressing them on their horizontal pivots and also in giving them lateral movements on their vertical pivots.

In Figs. 7 and 9 the training-shaft $e$ is arranged at an inclination to the axis of the gun, so that sufficient space is left between it and the mounting to enable the man No. 2 to reach his position on the platform $B^1$ without requiring the training hand-wheel to be made capable of turning about a hinge on the training-shaft. This arrangement of the training-shaft also enables it to be shorter than in the arrangements illustrated in the preceding figures, so that it is not necessary to have the ball-joint or the toothed gearing arrangements on said shaft.

$E^1$ is an auxiliary training hand-wheel which is situated on the side of the mounting opposite to that occupied by the men Nos. 1, 2, and 3, and $c^\times$ is the right hand sighting apparatus situated in a convenient position to be used by the man working this auxiliary training-wheel $E^1$ when standing on the platform $B^2$. This sight may be of the telescopic kind or of the open-bar type, comprising a bar with a fore sight 11 and a back sight 12 as shown in Fig. 20. The said bar is mounted on a horizontal hinge 13 carried by a bracket 14 secured to the gun cradle and the movements of elevation and depression about said hinge are effected by a hand wheel 15 (see Fig. 20). This hand wheel is carried by a spindle 16 terminating at its inner end in a worm 17 which engages with a worm wheel 18 mounted on a spindle 19 carrying a toothed wheel 20. This toothed wheel gears with a segmental rack 21 depending from the bar $c^\times$. It will thus be seen that by actuating the hand wheel 15 the bar $c^\times$ will be caused to turn about its pivot 13 to a greater or less extent in accordance with the degree of elevation or depression required to be imparted thereto. In order to laterally adjust the sight for deflection the back sight 12 forms part of a nut 22 which gears with a screw threaded spindle 23 (see Fig. 21). This spindle is mounted at its ends in a slotted traversing frame 24 on the sight bar. By revolving the said spindle by means of milled heads 25 at the end thereof, the back sight will be caused to travel to the right or left of the sight bar and thus effect the desired changes in the deflection. By providing the aforesaid auxiliary hand-wheel $E^1$, as well as the hand-wheel E, the training can be effected from either side of the mounting. This provision is necessary in view of the fact that as the opening in the armor of the casemate is restricted it sometimes happens that the view of the sight is obstructed on one or other side of the mounting when the latter is trained "hard over" in either direction. Thus in the mounting illustrated by Figs. 1 to 4 if the man No. 2 who does the sighting were to find that his line of sight were obstructed, as aforesaid, the man on the right-hand side of the mounting would have to train the gun by his hand-wheel $E^1$ in accordance with the directions of man No. 2. The said auxiliary hand-wheel $E^1$ also enables two men to simultaneously train the gun when the ship is rolling or tossing to a considerable extent and when greater power is required for this operation than could be conveniently obtained by one man.

In the modified arrangements illustrated by Figs. 4 to 6 and 7 to 9 we arrange for the sighting to be effected by man No. 1 situated on the platform $B^2$ and for the elevating and training of the gun to be effected by men Nos. 2 and 3 situated on the platform $B^1$. In these arrangements the sights $c$ and $c^\times$, of which there is one on each side of the mounting, are adapted to be actuated simultaneously, both as regards elevation and deflection, by the man No. 1. For this purpose the spindles $c^6$ of the two sighting apparatus are mounted horizontally, as shown in Figs. 5 and 8, and provided with cranks or crank-disks $c^8$, which are coupled together, as shown in Figs. 10 and 12, so as to avoid the effect of a dead-center. This may be effected by a bent connecting-rod $c^9$, which is provided near its middle with a crank $c^{10}$, carried by a bracket $A^\times$ on the gun-cradle. The said crank-disks $c^8$ may, however, be connected together by any other suitable means for enabling the two sights to be both elevated simultaneously. The worm spindles receive motion from the hand wheel C through the bevel gearing $c^7$ and $c^{7\times}$. We provide the connecting-rod with a ready means of attaching or detaching the same to or from the crank-disks and for enabling it to be readily adjusted. For this purpose the said connecting-rod $c^9$ has at its ends a screw-threaded plug $c^{11}$, engaging at one end with the said rod and at the other end with a socket $c^{12}$, Fig. 14, that is coupled with the crank-pins $c^{13}$ of the disks $c^8$. The said screw-threaded plug has a nut for enabling it to be turned for lengthening or shortening the cross-rod in accordance with the direction of its revolution. A lock-nut $c^{14}$ is also provided for retaining the said plug in its adjusted position, or the said plug may be adapted to receive at its outer end a screw-threaded pin $c^{15}$, Fig. 13, and a nut-lock $c^{16}$. For enabling the ready connection and disconnection of the connecting-rod with the said disks $c^8$ the sockets $c^{12}$ or the screw-pins $c^{15}$ may be formed with divided bearings, one member of which is pivoted at $c^{17}$ to the other, so as to permit of their being separated or opened when required, a hinged stirrup-piece or clip $c^{18}$, carried by one of said members, being adapted to engage with the other member to firmly retain the two members in their closed position. We also connect the two sights by a quickly-detachable cross-bar $c^{19}$, Fig. 11, so that the lateral movement or deflection of the right-hand sight will simultaneously impart a corresponding movement to the sight at the left-hand side of the mounting. For this purpose each sight $c$ and $c^\times$ has fixed thereto a bracket $c^{20}$ provided with a pin $c^{21}$ adapted to receive a forked connecting piece $c^{22}$ pivoted at each end of the cross-bar $c^{19}$ and furnished with a thumb piece or spring catch $c^{23}$, by means of which the bar can be readily disconnected from the sights, if so desired. To enable the length of the cross bar to be varied for initially adjusting the sights relatively to each other, the cross bar is made in two portions provided with right and left hand threads for engagement with an adjusting nut $c^{24}$ by which such portions are connected together, a lock nut $c^{25}$ being employed for retaining the parts in their adjusted position.

For the purpose of indicating the range we employ a large drum or disk $C^1$, mounted in connection with the sight, as aforesaid, and graduated in large bold figures, as indicated at Fig. 16. In some cases we arrange the drum or disk to revolve with respect to a fixed pointer $C^2$ as in Fig. 1, and in other cases we arrange the pointer to revolve with respect to the drum or disk, as in Figs. 5, 8, and 16. As the movements are very small at short ranges, we sometimes provide a special indicator arrangement $C^{1\times}$, connected with the axle of the movable pointer $C^{\times}$ by gearing, so as to work after the manner of the seconds-hand of a watch, thereby enabling us to have large graduations for short ranges as well as for long ranges.

For the purpose of indicating the deflection or drift we provide a large drum or disk $C^3$, Fig. 17, which may be graduated in degrees or knots, as may be desired, said drum or disk moving with respect to a fixed pointer, as in Fig. 1, or being fixed with respect to a movable pointer $C^{3\times}$, arranged to travel over its surface, as represented in Figs. 5, 7, and 17.

With a quick-firing mounting fixed in a casemate the sights are arranged very close to the sides of the mounting in order to avoid an excessive cutting away of the armor for the sighting-aperture. This position of the sights is found to be rather inconvenient for the gunner. In such cases we provide a telescopic or other sight with deflecting-prisms or reflecting-mirrors $c^{22}$, $c^{22}$, Fig. 15, so that although the eyepiece $c^{23}$ of the sight is at a satisfactory distance from the center of the mounting and in a convenient position for the gunner the actual line of sight $x\,x$ may be close to the center of the mounting, thereby avoiding the necessity of having a large sighting-aperture in the armor or shield.

What we claim, and desire to secure by Letters Patent of the United States is:—

1. In a gun-mounting, the combination with the sighting elevating and training gear and the means for enabling the operations of sighting elevating and training the gun to be independently performed by separate numbers; of a platform movable with the mounting and upon which the said numbers stand while performing their function, a support on said platform for the outer part of the training-gear shaft, a comparatively large hand-wheel mounted thereon, and means for enabling said hand-wheel to be shifted into and out of its operative position for the purpose specified.

2. In a gun-mounting, the combination with the sighting elevating and training gear and the means for enabling the operations of sighting elevating and training the gun to be independently performed by separate numbers; of a platform movable with the mounting and upon which the said numbers stand while performing their function, a support on said platform for the outer part of the training-gear shaft, a comparatively large hand-wheel hinged thereto, and a detachable locking-pin for securing said hand-wheel to its shaft when it is turned into its operative position substantially as described.

3. In a gun-mounting, the combination with the sighting elevating and training gear and the means whereby the operations of sighting elevating and training the gun can be independently performed by separate numbers; of means whereby the sight used by the gun-elevating number can be actuated for range and deflection by the sighting-number who is situated on the opposite side of the mounting substantially as described.

4. In a gun-mounting, the combination with the sighting-elevating and training gear and the means whereby the operations of sighting elevating and training the gun can be independently performed by separate numbers, of two sights one of which is situated at each side of the mounting, means for enabling the sight-setting number to actuate one of the sights, a bent connecting rod detachably coupled at each of its ends to a crank forming part of the sighting apparatus at each side of the mounting, and a crank supporting the said bent connecting-rod from a bracket on the gun-cradle, substantially as and for the purpose specified.

5. In a gun-mounting, the combination with the sighting elevating and training gear and the means whereby the operations of sighting elevating and training the gun can be independently performed by separate numbers; of two sights one of which is situated at each side of the mounting, means for enabling the sight-setting number to actuate one of the sights, a bent connecting-rod detachably coupled at each of its ends to a crank forming part of the sighting apparatus at each side of the mounting, means for adjusting the length of said connecting-rod, and a crank supporting the said bent connecting-rod from a bracket on the gun-cradle substantially as and for the purpose specified.

6. In a gun-mounting, the combination with the sighting, elevating and training gear and the means whereby the operations of sighting elevating and training the gun can be independently performed by separate numbers; of two sights one of which is situated at each side of the mounting, means for enabling the sight-setting number to actuate one of the sights, a connecting rod detachably coupled at each of its ends to a crank forming part of the sighting apparatus at each side of the mounting, and a crank supporting the said connecting-rod from a bracket on the gun-cradle, substantially as and for the purpose specified.

7. In a gun-mounting, the combination with the sighting elevating and training gear and the means whereby the operations of sighting elevating and training the gun can be independently performed by separate numbers; of two sights one of which is situated at each side of the mounting, means for enabling the sight-setting number to actuate one of the sights, a connecting-rod detachably coupled at each of its ends to a crank forming part of the sighting apparatus at each side of the mounting, means for adjusting the length of said connecting-rod, and a crank supporting the said connecting-rod from a bracket on the gun-cradle substantially as and for the purpose specified.

8. In a gun-mounting, the combination with the sighting, elevating and training gear and the means whereby the operations of sighting elevating and training the gun can be independently performed by separate numbers; of two sights one of which is situated at each side of the mounting, means for enabling the sight-setting number to actuate one of the sights, a connecting rod coupled at each of its ends to a crank forming part of the sighting apparatus at each side of the mounting, and a crank supporting the said connecting-rod from a bracket on the gun-cradle, substantially as and for the purpose specified.

9. In a gun-mounting, the combination with the sighting elevating and training gear and the means whereby the operations of sighting elevating and training the gun can be independently performed by separate numbers; of two sights one of which is situated at each side of the mounting, means for enabling the sight-setting number to actuate one of the sights, a connecting-rod coupled at each of its ends to a crank forming part of the sighting apparatus at each side of the mounting, means for adjusting the length of said connecting-rod, and a crank supporting the said connecting-rod from a bracket on the gun-cradle substantially as and for the purpose specified.

10. A sight for ordnance comprising two sighting members disposed one on each side of the gun, means for simultaneously elevating and depressing said members, and means for simultaneously adjusting said members laterally.

11. A sight for ordnance comprising two sighting members one disposed on each side of the gun and means for simultaneously adjusting said members.

In testimony whereof we have hereunto set our hands in presence of two subscribing witnesses.

ARTHUR TREVOR DAWSON.
GEORGE THOMAS BUCKHAM.

Witnesses:
HENRY KING,
ALFRED PEAKS.